United States Patent [19]
Silence et al.

[11] Patent Number: 5,847,038
[45] Date of Patent: Dec. 8, 1998

[54] POLYMER PROCESSES

[75] Inventors: Scott M. Silence, Fairport; Samir Kumar, Rochester; Michael J. Duggan, Webster, all of N.Y.

[73] Assignee: Xerox Corporation, Stamford, Conn.

[21] Appl. No.: 708,242

[22] Filed: Sep. 3, 1996

[51] Int. Cl.⁶ ................................................. C08K 3/22
[52] U.S. Cl. ......................... 524/430; 523/322; 523/323
[58] Field of Search ........................... 524/430; 523/303, 523/313, 319, 322, 323, 346

[56] References Cited

U.S. PATENT DOCUMENTS

| | | | |
|---|---|---|---|
| Re. 33,214 | 5/1990 | Crocker | 523/303 |
| 3,590,000 | 6/1971 | Palermiti et al. | 252/62.1 |
| 3,937,774 | 2/1976 | Wiley | 264/26 |
| 4,177,446 | 12/1979 | Diaz | 338/212 |
| 4,233,387 | 11/1980 | Mammino et al. | 430/137 |
| 4,264,697 | 4/1981 | Perez et al. | 430/107 |
| 4,277,673 | 7/1981 | Kelly | 219/528 |
| 4,330,703 | 5/1982 | Horsma | 219/553 |
| 4,341,262 | 7/1982 | Alspaugh | 165/1 |
| 4,543,474 | 9/1985 | Horsma | 219/553 |
| 4,935,326 | 6/1990 | Creatura et al. | 430/108 |
| 4,937,166 | 6/1990 | Creatura et al. | 430/108 |
| 5,098,609 | 3/1992 | Iruvanti | 523/514 |
| 5,232,775 | 8/1993 | Chamberlain | 428/323 |
| 5,232,970 | 8/1993 | Solc | 524/404 |
| 5,376,702 | 12/1994 | Stibal | 523/313 |
| 5,385,780 | 1/1995 | Lee | 523/201 |
| 5,391,604 | 2/1995 | Dietz | 524/440 |
| 5,529,708 | 6/1996 | Palmgren | 252/62.54 |
| 5,532,083 | 7/1996 | McCullough | 429/210 |
| 5,618,390 | 4/1997 | Yu | 204/192.26 |

*Primary Examiner*—Paul R. Michl
*Attorney, Agent, or Firm*—E. O. Palazzo

[57] ABSTRACT

A process which comprises subjecting a mixture of a polymer, a conductive component and an additive to an energy of from about 1 to about 20 kilowatt hours per kilogram and an intensity of from about 20 to about 90 kilowatts per kilogram.

41 Claims, No Drawings

5,847,038

POLYMER PROCESSES

BACKGROUND OF THE INVENTION

The present invention is generally directed to processes for the preparation of polymers, and more specifically processes for the preparation of polymers with additives and conductive components therein and which polymers can be selected as carrier coatings, reference for example U.S. Pat. Nos. 4,937,166 and 4,935,326, the disclosures of each of these patents being totally incorporated herein by reference. In embodiments of the present invention the processes thereof eliminate or minimize the severe dusting problems associated with the preparation of coated carrier components by utilizing a Nara Hybridizer (manufactured by Nara Machine Company, Ltd.), and more specifically, by processing the polymer powder with additive and conductive component, such as an insulating particulate additive in a Nara Hybridizer prior to the carrier coating process, and wherein in embodiments there is enabled excellent adhesion between the additive and the polymer coating, wherein the additive is substantially permanently embedded in the polymer, and wherein the dust generated with known carrier manufacturing methods is minimized or avoided.

Also, with the present invention in embodiments, there are enabled carrier particles with excellent stable triboelectric charging properties and stable desirable conductivities.

Carrier particles for use in the development of electrostatic latent images are described in many patents including, for example U.S. Pat. No. 3,590,000. These carrier particles may comprise various cores, including steel, with a coating thereof of fluoropolymers; and terpolymers of styrene, methacrylate, and silane compounds. There is also illustrated in U.S. Pat. No. 4,233,387, the disclosure of which is totally incorporated herein by reference, coated carrier components for electrostatographic developer mixtures comprised of finely divided toner particles clinging to the surface of the carrier particles. Specifically, there is disclosed in this patent coated carrier particles obtained by mixing carrier core particles of an average diameter of from between about 30 microns to about 1,000 microns, with from about 0.05 percent to about 3.0 percent by weight, based on the weight of the coated carrier particles, of thermoplastic resin particles. The resulting mixture is then dry blended until the thermoplastic resin particles adhere to the carrier core by mechanical impaction, and/or electrostatic attraction. Thereafter, the mixture is heated to a temperature of from about 320° F. to about 650° F. for a period of 20 minutes to about 120 minutes, enabling the thermoplastic resin particles to melt and fuse on the carrier core.

With this process and the processes of U.S. Pat. Nos. 4,935,326 and 4,937,166, the disclosures of which are totally incorporated herein by reference, there can be generated dust which can result in lower than intended polymer coating weights and greater variability in polymer carrier weight, adversely affecting the triboelectrical charging and conductivity characteristics of the carrier and toner. Specifically, polymer powders which do not electrostatically adhere well to the carrier core surface during the blending process generate airborne polymer dust when agitated. Agitation occurs during several operations including, for example, when the polymer/core mixture is transferred from blenders into containers and from containers into feeders prior to the rotary kiln high temperature fusing process. In addition to variability in coating weight, which adversely affects the triboelectrical charging and conductivity characteristics of the carrier and toner, the generation of unwanted dust may present health and safety hazards during processing and increase the amount of polymer necessary to coat the carrier, and therefore the cost of the carrier.

With further reference to the prior art, carriers obtained by applying insulating resinous coatings to porous metallic carrier cores using solution coating techniques are undesirable from many viewpoints. For example, the coating material will usually reside in the pores of the carrier cores, rather than at the surfaces thereof; and therefore, may not be readily available for triboelectric charging when the coated carrier particles are mixed with finely divided toner particles. Attempts to resolve this problem by increasing the carrier coating weights, for example, to as much as 5 percent or greater to provide an effective triboelectric coating to the carrier particles necessarily involves handling excessive quantities of solvents, and further usually these processes result in low product yields. Also, solution coated carrier particles when combined and mixed with finely divided toner particles provide in some instances triboelectric charging values which are too low for many uses. The powder coating process of the present invention overcomes these disadvantages, and further enables developer mixtures that are capable of generating high and useful triboelectric charging values with finely divided toner particles; and also wherein the carrier particles are of substantially constant conductivity. Further, when resin coated carrier particles are prepared by the process of the present invention, the majority of the coating materials are fused to the carrier surface thereby reducing the number of toner impaction sites on the carrier material.

Additionally, there can be achieved with the process of the present invention, independent of one another, desirable triboelectric charging characteristics and conductivity values; that is, for example the triboelectric charging parameter is not solely dependent on the carrier coating weight, as is believed to be the situation with the process of U.S. Pat. No. 4,233,387, but can be changed through the choice of insulating particle additive attached to the polymer in a Nara Hybridizer. Thus, for example, there can be formulated in accordance with the invention of the present application developers with conductivities of from about $10^{-6}$ mho(cm)$^{-1}$ to $10^{-17}$ mho(cm)$^{-1}$ as determined in a magnetic brush conducting cell; and triboelectric charging values of from about −8 to −80 microcoulombs per gram on the carrier particles as determined by the known Faraday cage technique. Thus, the developers of the present invention can be formulated with constant conductivity values with different triboelectric charging characteristics by, for example, maintaining the same polymer coating weight on the carrier particles and changing the insulating particle additive composition attached to the polymer in a Nara Hybridizer. Similarly, there can be formulated developer compositions wherein constant triboelectric charging values are achieved and the conductivities are altered by retaining the additive and modifying the coating weight for the carrier particles.

Other patents that may be of interest include U.S. Pat. No. 3,939,086, which discloses steel carrier beads with polyethylene coatings, see column 6; U.S. Pat. No. 4,264,697, which discloses dry coating and fusing processes; U.S. Pat. Nos. 3,533,835; 3,658,500; 3,798,167; 3,918,968; 3,922,382; 4,238,558; 4,915,987; 4,310,611; 4,397,935; and 4,434,220.

SUMMARY OF THE INVENTION

It is an object of the present invention to provide toner and developer compositions with carrier particles containing a polymer coating. In another object of the present invention there are provided dry coating processes for generating carrier particles of substantially constant conductivity parameters.

In yet another object of the present invention there are provided dust free processes for generating polymers and carrier particles thereof with substantially constant conductivity parameters, and a wide range of preselected triboelectric charging values.

In yet a further object of the present invention there are provided processes for the preparation of conductive polymers and carrier particles thereof, and more specifically, wherein the conductive polymer is selected as a coating for the carrier.

Additionally, in another object of the present invention there are provided processes for the preparation of powder polymers containing small effective amounts of insulating particulate additives, and which processes are accomplished in a Nara Hybridizer.

Moreover, in another object of the present invention to provide processes for improving the charging characteristics of carrier particles by the intensive surface modification of the carrier polymer coating selected, and wherein the method involves in embodiments the embedding of particulate additives into the surface of the polymer with a high intensity device, such as a Nara Hybridizer, which imparts a power of from about 20 to about 90 watts per gram to the polymer, and which polymers can be selected as carrier coatings, which intensity is about 40 to 50 times more than a Henschel FM10. Additives that may be selected include fumed silicas, silicon dioxides, titanium dioxides, nanocrystal metals such as aluminum, nickel, molybdenum, nanometer sized ceramic components such as barium titanium oxides, strontium titanium oxides, and the like.

Furthermore, in another object of the present invention there are provided polymer processes wherein undesirable dust is avoided or minimized. Generation of unwanted dust can result in lower than intended polymer coating weights and greater variability in polymer weight of the carrier, adversely affecting the triboelectrical charging and conductivity characteristics of the carrier and toner. In addition, the generation of unwanted dust may present health and safety hazards during processing and increase the amount of polymer necessary to coat the carrier, and therefore, the cost of the carrier.

Also, in another object of the present invention there are provided processes for the preparation of conductive polymers, wherein the polymer has dispersed or embedded therein an additive like formed silica and a conductive component, such as carbon black in an amount of from about 15 to about 40 weight percent, based on the weight percent of the polymer and conductive component, and wherein the hybridizer selected for the process deforms the polymer surface at impact temperatures in close proximity to the Tg of the polymer thereby permitting the insulating additive component particles to be completely beaten into the surface of the polymer, and thus minimizing the loose attachment of these additives to the carrier subsequent to fusing the polymer to the carrier core. Loosely attached additives adversely effect the electrical characteristics of the developer, such as causing triboelectric charge instability and variability in the conductivity parameter.

Further, another object of the present invention relates to processes for the preparation of carrier polymer coatings and wherein the insulating additives selected possess an average contact potential in close proximity to the carrier polymer coating, for example the contact potential of the additive is sufficiently close to that of the conductive polymer that the insulative component alters the triboelectric charge imparted by the carrier to the toner by about from −2 microcoulombs per gram to about +2 microcoulombs per gram and preferably from about −1 microcoulombs per gram to about +1 microcoulombs per gram, relative to the triboelectric charge imparted to the toner by carrier coated with the conductive polymer alone.

In embodiments the additive selected enables excellent adhesion between the polymer and the carrier core, and thus the formation of dust is minimized or eliminated during the carrier manufacturing process, that is when the carrier core and polymer are heated at high temperatures to fuse the polymer to the core.

Additionally, in another object of the present invention there are provided processes for the preparation of carrier particles wherein the insulating additive selected is firmly attached mechanically to the polymer powder, that is the additive, for example, is substantially permanently attached to the polymer by a high intensity device, such as a Nara Hybridizer, followed by the high temperature fusing of the polymer to a carrier core, and thereafter, adding to the polymer a conductive component, and preferably adding the conductive component prior to the fusing of the polymer.

In still a further object of the present invention there are is provided carrier particles of insulating characteristics comprised of a core with a coating thereover generated from a polymer prepared as illustrated herein, and wherein dust can be avoided or wherein dust is minimized.

Further, in an additional object of the present invention there are provided carrier particles comprised of a core with a coating thereover generated from a polymer and an additive, such as a fumed silica like the AEROSILS® available from Cabosil Corporation, and wherein the triboelectric charging values of the carrier after fusing and cooling are from about −8 microcoulombs to about −80 microcoulombs per gram at the same coating weight.

These and other objects of the present invention are accomplished by providing developer compositions comprised of toner particles, and carrier particles prepared by a powder coating process, and wherein the carrier particles are comprised of a core with a polymeric coating thereover. More specifically, the carrier particles selected can be prepared by mixing low density porous magnetic, or magnetically attractable metal core carrier particles with from, for example, between about 0.05 percent and about 3 percent by weight, based on the weight of the coated carrier particles, of polymer, or mixture of polymers until adherence thereof to the carrier core by mechanical impaction or electrostatic attraction; heating the mixture of carrier core particles and polymers to a temperature, for example, of between from about 200° F. to about 550° F., for a period of from about 10 minutes to about 60 minutes enabling the polymers to melt and fuse to the carrier core particles; cooling the coated carrier particles; and thereafter, classifying the obtained carrier particles to a desired particle size, and wherein prior to heating the polymer coating is prepared by processing a polymer powder with an insulating additive in a Nara Hybridizer.

The present invention in embodiments is directed to a process which comprises subjecting a mixture of a polymer, a conductive component like carbon black and an additive like fumed silica to an energy of from about 1 to about 20 kilowatt hours per kilogram and an intensity of from about 20 to about 90 kilowatts per kilogram; a substantially dust free process for the preparation of polymers with additives which process comprises subjecting a mixture of polymers and an additive to an energy of from about 1 to about 20 kilowatts hours per kilogram and an intensity of from about 20 to about 90 kilowatts per kilogram, and wherein said subjecting is accomplished until said additives are embedded in said polymers; and a process for the preparation of carrier particles which comprises subjecting a mixture of a polymer, a conductive component, and an additive to an energy of from about 1 to about 20 kilowatt hours per kilogram and an intensity of from about 20 to about 90 kilowatts per kilogram, and thereafter, applying the polymer product obtained to a carrier core.

Embodiments of the present invention relate to a process for the preparation of polymers, such as polymethylmethacrylate, by modifying the surface of the polymer particles by a mechanical-thermal process in a Nara Hybridizer. Polymer particles, such as polymethylmethacrylate, into which has been dispersed a conductive additive, such as carbon black, prior to insertion into the Hybridizer and an insulative additive, such as silicon dioxide or a metal oxide, at a weight of from about 1 to 30 percent by weight, preferably from about 5 to 15 percent by weight, are repeatedly circulated through the impact chamber, where they collide with pins on a high-speed rotating plate surrounded by a collision ring. The additive particles are beaten onto the surface of the polymer particles and fixed/implanted on the surface thereof. The processing conditions include a tool RPM of from about 8,000 to 14,000 preferably 12,000 to 14,000, a run time of about 2 to 20 minutes preferably from about 5 to 15 minutes, and a batch load or feed rate which depends on the scale of the instrument, reference Table 1. The batch temperature can be controlled by external cooling or heating to produce a temperature which is the polymer or resin Tg. For example, with the conditions of 14,000 RPM, a batch run time of 10 minutes, and a batch size of 25 grams (NHS-0), and a maximum batch temperature of 245° F. is reached without external cooling or heating.

TABLE 1

| Hybridizer Type | Power | Capacity (kg/hr) |
| --- | --- | --- |
| NHS-0 | 2.2 | 25 g samples (lab scale) |
| NHS-1 | 3.7 to 5.5 | 3.5 |
| NHS-2 | 7.5 to 11 | 6 |
| NHS-3 | 15 to 22 | 15 |
| NHS-4 | 30 to 45 | 35 |
| NHS-5 | 55 to 90 | 50 | the carrier compositions can be comprised of known core materials including iron, ferrites, such as copper zinc ferrites, and other known ferrites available from Steward Chemicals, steel, strontium ferrites, and the like with a dry polymer coating mixture thereover. Subsequently, developer compositions of the present invention can be generated by mixing the aforementioned carrier particles with a toner composition comprised of resin particles and pigment particles.

Various suitable solid core carrier materials can be selected. Characteristic core properties of importance include those that will enable the toner particles to acquire a positive charge or a negative charge; and carrier cores that will permit desirable flow properties in the developer reservoir present in the xerographic imaging apparatus. Also of value with regard to the carrier core properties are, for example, suitable magnetic characteristics that will permit magnetic brush formation in mag brush development processes; and also wherein the carrier cores possess desirable mechanical aging characteristics. Examples of carrier cores are as illustrated herein and specifically include iron, steel, ferrites, magnetites, nickel, and mixtures thereof. Preferred carrier cores include ferrites, and sponge iron, or steel grit with an average particle size diameter of from between about 30 microns to about 200 microns.

Illustrative examples of polymer coatings selected for the carrier particles of the present invention include known polymers and also those that are not in close proximity in the triboelectric series. Specific examples of polymers are polyvinylidene fluoride, polyethylene; polymethylmethacrylate, copolyethylenevinylacetate, copolyvinylidene fluoride tetrafluoroethylene, and polymethylmethacrylate and polyvinylidene fluoride. Other related polymer mixtures not specifically mentioned herein can be selected providing the objectives of the present invention are achieved, including for example polystyrene, tetrafluoroethylene, tetrafluoroethylene, polyvinyl chloride, KYNAR®, a polyvinylidene fluoride, TEFLON®, a polyvinylfluoride, and the like. Examples of insulative additives attached to a polymer by means of the Nara Hybridizers are as illustrated herein and include surface treated silicon dioxide particles such as TS530 (Cabosil Corporation), W2050 (Wacker Chemical), A76 (Tayca Corporation), titanium dioxide particles, such as MT3103 (NAC Corporation), barium titanate (TPL, Inc.), FANAL PINK™ (BASF Corporation), and the like, which additives are selected in various effective amounts, such as for example from about 2 to about 30 and preferably from about 5 to about 15 percent by weight of the polymer/conductive additive/insulative additive combination. A primary function of the additive is to attach, for example, substantially permanently attach, the polymer to the carrier core prior to fusing of the polymer. The conductive component selected includes carbon black and this component is usually added to the polymer additive mixture utilizing the hybridizer and prior to fusing the polymer to the carrier core. The conductive component enables a carrier with, for example, a conductivity of from about $10^{-12}$ to about $10^{-6}$ and preferably from about $10^{-9}$ to about $10^{-6}$ (ohm-cm)$^{-1}$. A number of toner resins can be selected for the toner composition, such as styrene acrylates, styrene methacrylates, styrene butadienes, polyesters, extruded polyesters, reference U.S. Pat. Nos. 5,376,494 and 5,227,460, the disclosures of which are totally incorporated herein by reference.

As one preferred toner resin there can be selected the esterification products of a dicarboxylic acid and a diol comprising a diphenol, reference U.S. Pat. No. 3,590,000, the disclosure of which is totally incorporated herein by reference. Other preferred toner resins include styrene/methacrylate copolymers; styrene/butadiene copolymers; polyester resins obtained from the reaction of bisphenol A and propylene oxide; and branched polyester resins resulting from the reaction of dimethylterephthalate, 1,3-butanediol, 1,2-propanediol and pentaerythritol. Generally, from about 1 part to about 5 parts by weight of toner particles are is mixed with from about 10 to about 300 parts by weight of the carrier particles prepared in accordance with the process of the present invention.

Numerous well known suitable pigments or dyes can be selected as the colorant for the toner particles including, for example, carbon black, nigrosine dye, lamp black, iron oxides, magnetites, and mixtures thereof. The pigment, which is preferably carbon black, should be present in a sufficient amount to render the toner composition highly colored. Thus, the pigment particles are present in amounts of from about 3 percent by weight to about 20 percent by weight, based on the total weight of the toner composition, however, lesser or greater amounts of pigment particles can be selected providing the objectives of the present invention are achieved.

When the pigment particles are comprised of magnetites, which are a mixture of iron oxides (FeO, $Fe_2O_3$) including those commercially available as MAPICO BLACK™, they are present in the toner composition in an amount of from about 10 percent by weight to about 70 percent by weight, and preferably in an amount of from about 20 percent by weight to about 50 percent by weight.

The resin particles are present in a sufficient, but effective amount, thus when 10 percent by weight of pigment, or colorant, such as carbon black, is contained therein, about 90 percent by weight of resin material is selected. Generally, however, providing the objectives of the present invention are achieved, the toner composition is comprised of from about 85 percent to about 97 percent by weight of toner resin particles, and from about 3 percent by weight to about 15 percent by weight of pigment particles, such as carbon black.

Generally, from about 1 part to about 5 parts by weight of toner particles are mixed with from about 10 to about 300 parts by weight of the carrier particles prepared in accordance with the process of the present invention.

Also encompassed within the scope of the present invention are colored toner compositions comprised of toner resin particles, carrier particles and as pigments or colorants, magenta, cyan and/or yellow particles, as well as mixtures thereof. More specifically, illustrative examples of magenta materials that may be selected as pigments include 1,9-dimethyl-substituted quinacridone and anthraquinone dye identified in the Color Index as CI 60720, CI Dispersed Red 15, a diazo dye identified in the Color Index as CI 26050, CI Solvent Red 19, and the like. Examples of cyan materials that may be used as pigments include copper tetra-4 (octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, permanent yellow FGL, and the like. These colorants, especially pigments, are generally present in the toner composition an amount of from about 1 weight percent to about 15 weight percent based on the weight of the toner resin particles.

For further enhancing the positive charging characteristics of the developer compositions described herein, and as optional components there can be incorporated herein charge enhancing additives inclusive of alkyl pyridinium halides, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium sulfate; and other similar known charge enhancing additives. These additives are usually incorporated into the toner in an amount of from about 0.1 percent by weight to about 20 percent by weight.

The toner composition can be prepared by a number of known methods including melt blending the toner resin particles, and pigment particles or colorants followed by mechanical attrition. Other methods include those well known in the art such as spray drying, melt dispersion, dispersion polymerization and suspension polymerization. In one dispersion polymerization method, a solvent dispersion of the resin particles and the pigment particles are spray dried under controlled conditions to result in the desired product.

The toner and developer compositions may be selected for use in electrostatographic imaging processes containing therein conventional photoreceptors, including inorganic and organic photoreceptor imaging members. Examples of imaging members are selenium, selenium alloys, and selenium or selenium alloys containing therein additives or dopants such as halogens. Furthermore, there may be selected organic photoreceptors, illustrative examples of which include layered photoresponsive devices comprised of transport layers and photogenerating layers, reference U.S. Pat. No. 4,265,990, the disclosure of which is totally incorporated herein by reference, and other similar layered photoresponsive devices. Examples of generating layers include trigonal selenium, metal phthalocyanines, metal free phthalocyanines, titanyl phthalocyanines, perylenes, hydroxy phthalocyanines, and vanadyl phthalocyanines. As charge transport molecules there can be selected the aryl diamines disclosed in the '990 patent. Also, there can be selected as photogenerating pigments, squaraine compounds, thiapyrillium materials, and the like. These layered members are conventionally charged negatively thus requiring a positively charged toner. Moreover, the developer compositions of the present invention are particularly useful in electrostatographic imaging processes and apparatuses wherein there is selected a moving transporting means and a moving charging means; and wherein there is selected a deflected flexible layered imaging member, reference U.S. Pat. Nos. 4,394,429 and 4,368,970, the disclosures of which are totally incorporated herein by reference.

Images obtained with this developer composition had acceptable solids, excellent halftones and desirable line resolution, with acceptable or substantially no background deposits, and wherein the developers are substantially resistant to relative humidity of from about 20 to about 80 percent RH.

With further reference to the process for generating the carrier particles illustrated herein, there is initially obtained, usually from commercial sources, the uncoated carrier core additive, and the polymer powder coating. The individual components for the coating are available, for example, from Pennwalt as 301 F KYNAR®, Cabosil Corporation as TS530, and other sources. Thereafter, the polymer and insulating additive are incorporated into a Nara Hybridizer, at about 10 percent by weight of the additive to the polymer in a preferred embodiment and the polymer and additive blend is processed at sufficient process conditions and for a sufficient length of time to firmly attach the additive to the polymer surface. Thereafter, the carrier core is incorporated into a mixing apparatus with the polymer which contains the insulative additive firmly attached to the polymer surface, about 1 percent by weight of the polymer to the core by weight in a preferred embodiment, and mixing is affected for a sufficient period of time until the polymer blend is uniformly distributed over the carrier core, and mechanically or electrostatically attached thereto. Subsequently, the resulting coated carrier particles are metered into a rotating tube furnace, which is maintained at a sufficient temperature to cause melting and fusing of the polymer blend to the carrier core.

The following Examples are being supplied to further define the present invention, it being noted that these Examples are intended to illustrate and not limit the scope of the present invention. Parts and percentages are by weight unless otherwise indicated.

In the Examples that follow, an intensity (or specific power) of 88 kilowatts per kilogram and an energy of 14.7 kilowatt hours per kilogram was selected and imparted to the polymer, conductive component and additive mixture.

EXAMPLE I 23.75 Grams of 19 percent Conductex SC Ultra carbon black dispersed into poly(methylmethacrylate) and 1.25 grams of W2050 $SiO_2$ (Wacker Corp.) squaraine compounds, thiapyrillium materials, and the like. These layered members are conventionally charged negatively thus requiring a positively charged toner. Moreover, the developer compositions of the present invention are particularly useful in electrostatographic imaging processes and apparatuses wherein there is selected a moving transporting means and a moving charging means; and wherein there is selected a deflected flexible layered imaging member,d impact operation was around 240° F., which is close to polymer $T_g$. As the additives were embedded into the polymer surface, the batch temperature decreased and leveled off at around 160° F. The volume median diameter of the processed polymer conductive powder decreased from 3.7 to 2.4 $\mu$m, the volume percent >20 $\mu$m decreased from 8.4 to 0.1, the volume percent>10 $\mu$m decreased from 15.4 to 4.5, and the fines content of the powder showed little change, indicating the only effect of the hybridizer on the particle size distribution was to decrease the coarse content of the powder.

The resulting polymer powder of polymethyl methacrylate with $SiO_2$ embedded therein and carbon black thereon was mixed with 90 $\mu$m anchor steel core (Hoeganese Corporation) in an M5R blender for 20 minutes at 50 rpm (1 percent additive/polymer by weight, 10 pound loading). Another polymer/core blend was made using the same mixing conditions with 19 percent Conductex SC Ultra carbon black dispersed into poly(methylmethacrylate) which has not been processed with W2050 $SiO_2$.

Visual observation of the dust clouds formed when dumping the core mixed with the hybridizer processed conductive polymer+5 percent W2050 $SiO_2$, appeared significantly lower than unprocessed conductive polymer and core mixtures. To quantify this difference, a measurement was set up using a MINIRAM Model PDM-3 airborne particulate monitor. The measurement was set up to simulate (on a small scale) in a controlled environment the process of dumping the polymer and core mixture and measuring the density of the dust cloud produced. The measurement was accomplished as follows.

A core/polymer mixture (60 grams) was fed through a funnel (diameter=0.24 centimeter) which dropped the material 17.2 centimeters into an enclosed container. The dust level in the container was measured as a function of time after dropping the mixture. The actual measurement was made by a MIE Corporation, MINIRAM Model PDM-3 airborne particulate monitor. The operating principle of this instrument was based on the detection of scattered electromagnetic radiation in the near infrared. The MINIRAM used a pulsed GsAIAs light emitting source, which generated a narrow-band emission centered at 880 nanometers. The radiation scattered by airborne particles was sensed over an angular range of approximately 45° to 95° from the forward direction by means of a silicon-photovoltaic hybrid detector with internal low-noise preamplifier. An optical interference-type filter was used to screen out any light whose wavelength differed from that of the pulsed source. The results are shown in the following Table, where the dust levels are an average of 6 readings taken from the initial mixture dropping. The measurement was repeated six times for each material. All dust levels shown are statistically different from each other, as determined by t-test (a=0.05).

| Coating Polymer | Core | Dust level (mg/m$^3$) | Std. Dev. n = 6 | q/m ($\mu$C/g) | í (mho/cm) |
|---|---|---|---|---|---|
| PMMA/carbon black (no additive) | Hoeganese 90 $\mu$m anchor steel | 5.7 | 0.8 | 13.2 (+/−0.8) | 1.1 × 10$^{-6}$ |
| PMMA/carbon black + 5 percent W2050 SiO$_2$ processed in hybridizer | Hoeganese 90 $\mu$m anchor steel | 2.8 | 0.4 | 12.9 (+/−1.1) | 2.7 × 10$^{-7}$ |
| Kynar/PMMA | Hoeganese 65 $\mu$m spherical magnetite | 1.70 | 0.03 | — | — |

It is evident that the addition of 5 percent W2050 $SiO_2$ strongly reduced the amount of dust generated (compared to unprocessed conductive polymer) when the core/polymer mixture was disturbed. The level is near that produced with an insulating PMMA/KYNAR® polymer (mixed with a spherical magnetite core), which does not present a dust problem.

There were prepared carrier particles by coating 4,545 grams of a Hoeganese anchor steel core, 90 microns in diameter, with 45 grams of the 10 19 percent Conductex SC Ultra carbon black dispersed into poly(methylmethacrylate) hybridized in a Nara Hybridizer with W2050 $SiO_2$, 1 percent coating weight, by mixing these components for 20 minutes in a Munson M5R Minimixer, rotating at 50 RPM. There resulted uniformly distributed and electrostatically attached, as determined by visual observation, on the carrier core the polymer plus insulative additive material. Thereafter, the resulting carrier particles were inserted into a rotating tube furnace for a period of 30 minutes. This furnace was maintained at a temperature of 400° F. thereby causing the polymer to melt and fuse to the core.

A developer composition was then prepared by mixing 194 grams of the above prepared carrier particles with 6 grams of a toner composition comprised of 87 percent by weight of a crosslinked polyester resin, 5 percent by weight of carbon black, 4 percent by weight of a polypropylene wax, and 4 percent by weight of a compatibilizing agent comprised of KRATON™ obtained from Shell Chemicals. Thereafter, the triboelectric charge on the carrier particles was determined by the known Faraday Cage process, and there was measured on the carrier a charge of 13.2 microcoulombs per gram. Further, the conductivity of the carrier, as determined by forming a 0.1 inch long magnetic brush of the carrier particles, and measuring the conductivity by imposing a 10 volt potential across the brush, was 2.7×10$^{-7}$ mho-cm$^{-1}$. Therefore, these carrier particles were conducting.

The same procedure for coating the 19 percent Conductex SC Ultra carbon black dispersed into poly(methylmethacrylate) onto Hoeganese 90 micron anchor steel core was accomplished, and a developer was prepared in a substantially identical manner as above, except without a Nara Hybridizer. Thereafter, the triboelectric charge on the carrier particles was determined by the known Faraday Cage process, and there was measured on the carrier a charge of 12.9 microcoulombs per gram, which is substantially identical to carriers produced with the polymer to which W2050 SiO$_2$ is attached by the Nara Hybridizer. Further, the conductivity of the carrier, as determined by forming a 0.1 inch long magnetic brush of the carrier particles, and measuring the conductivity by imposing a 10 volt potential across the brush, was $1.1 \times 10^{-7}$ mho-cm$^{-1}$. Therefore, these carrier particles were also conducting.

In all the Examples, the triboelectric charging values and the conductivity numbers were obtained in accordance with the aforementioned procedure.

EXAMPLE II 22.5 Grams of 19 percent Conductex SC Ultra carbon black dispersed into poly(methylmethacrylate) and 2.5 grams of TS530 SiO$_2$ (Cabosil Corporation) were processed in the Nara Hybridizer (NHS-0) using the processing conditions of Example I. There were prepared carrier particles by coating 4,545 grams of a Hoeganese anchor steel core, 90 microns in diameter, with 45 grams of the 19 percent Conductex SC Ultra carbon black dispersed into poly(methylmethacrylate) hybridized with TS530 SiO$_2$, 1 percent coating weight, by the procedure of Example I. Scanning electron microscopy confirmed the presence of the silica particles on the surface of the carrier.

A developer composition was then prepared by mixing 194 grams of the above prepared carrier particles with 6 grams of the toner composition of Example I. Thereafter, the triboelectric charge on the carrier particles was determined by the known Faraday Cage process, and there was measured on the carrier a charge of 9.5 microcoulombs per gram, substantially lower than the triboelectric charge imparted to a carrier coated with 19 percent Conductex SC Ultra carbon black dispersed into poly(methylmethacrylate) without processing in the hybridizer, 12.9 microcoulombs per gram, or with processing in the Nara Hybridizer, but without the addition of an insulating additive, 12.3 microcoulombs per gram. Further, the conductivity of the carrier, as determined by forming a 0.1 inch long magnetic brush of the carrier particles, and measuring the conductivity by imposing a 10 volt potential across the brush, was $4.8 \times 10^{-7}$ mho-cm$^{-1}$. Therefore, these carrier particles were also conducting.

EXAMPLE III 22.5 Grams of 19 percent Conductex SC Ultra carbon black dispersed into poly(methylmethacrylate) and 2.5 grams of W2050 SiO$_2$ (Wacker Corporation) were processed in a lab scale Nara Hybridizer (NHS-0) using the processing conditions of Example I. There were prepared carrier particles by coating 4,545 grams of a Hoeganese anchor steel core, 90 microns in diameter, with 45 grams of the 19 percent Conductex SC Ultra carbon black dispersed into poly(methylmethacrylate) hybridized with W2050 SiO$_2$, 1 percent coating weight, by the procedure of Example I. Scanning electron microscopy confirmed the presence of the silica particles on the surface of the carrier.

A developer composition was then prepared by mixing 194 grams of the above prepared carrier particles with 6 grams of the toner composition of Example I. Thereafter, the triboelectric charge on the carrier particles was determined by the known Faraday Cage process, and there was measured on the carrier a charge of 10.7 microcoulombs per gram, lower than the triboelectric charge imparted to a carrier coated with 19 percent Conductex SC Ultra carbon black dispersed into poly(methylmethacrylate) without processing in the hybridizer, 12.9 microcoulombs per gram, or with processing in the Nara Hybridizer, but without the addition of an insulating additive, 12.3 microcoulombs per gram. Further, the conductivity of the carrier as determined by forming a 0.1 inch long magnetic brush of the carrier particles, and measuring the conductivity by imposing a 10 volt potential across the brush, was $4.0 \times 10^{-7}$ mho-cm$^{-1}$. Therefore, these carrier particles were also conducting.

EXAMPLE IV

20 Grams of 19 percent Conductex SC Ultra carbon black dispersed into poly(methylmethacrylate) and 5 grams of A76 SiO$_2$ (Tayca Corporation) were processed in the Nara Hybridizer (NHS-0) using the processing conditions of Example I. There were prepared carrier particles by coating 4,545 grams of a Hoeganese anchor steel core, 90 microns in diameter, with 45 grams of the 19 percent Conductex SC Ultra carbon black dispersed into poly(methylmethacrylate) hybridized with A76 SiO$_2$, 1 percent coating weight, by the procedure of Example I.

A developer composition was then prepared by mixing 194 grams of the above prepared carrier particles with 6 grams of the toner composition of Example I. Thereafter, the triboelectric charge on the carrier particles was determined by the known Faraday Cage process, and there was measured on the carrier a charge of 14.4 microcoulombs per gram, substantially higher than the triboelectric charge imparted to a carrier coated with 19 percent Conductex SC Ultra carbon black dispersed into poly(methylmethacrylate) without processing in the hybridizer, 12.9 microcoulombs per gram, or with processing in the Nara Hybridizer, but without the addition of an insulating additive, 12.3 microcoulombs per gram. Further, the conductivity of the carrier, as determined by forming a 0.1 inch long magnetic brush of the carrier particles, and measuring the conductivity by imposing a 10 volt potential across the brush, was $1.8 \times 10^{-7}$ mho-cm$^{-1}$. These carrier particles were conducting.

EXAMPLE V

24 Grams of the conductive component 19 percent Conductex SC Ultra carbon black dispersed into poly(methylmethacrylate) and 1 gram of FANAL PINK™ pigment (BASF Corporation) were processed in the Nara Hybridizer (NHS-0) using the processing conditions of Example I. There were prepared carrier particles by coating 4,545 grams of a Hoeganese anchor steel core, 90 microns in diameter, with 45 grams of the 19 percent Conductex SC Ultra carbon black dispersed into poly(methylmethacrylate) hybridized with FANAL PINK™ additive, 1 percent coating weight, by the procedure of Example I.

A developer composition was then prepared by mixing 194 grams of the above prepared carrier particles with 6 grams of the toner composition of Example I Thereafter, the triboelectric charge on the carrier particles was determined by the known Faraday Cage process, and there was measured on the carrier a charge of 13.9 microcoulombs per gram, substantially higher than the triboelectric charge imparted to a carrier coated with 19 percent Conductex SC Ultra carbon black dispersed into poly(methylmethacrylate)

without processing in the hybridizer, 12.9 microcoulombs per gram, or with processing in the Nara Hybridizer, but without the addition of an insulating additive, 12.3 microcoulombs per gram. Further, the conductivity of the carrier as determined by forming a 0.1 inch long magnetic brush of the carrier particles, and measuring the conductivity by imposing a 10 volt potential across the brush, was $6.0 \times 10^{-7}$ mho-cm$^{-1}$. These carrier particles were conducting.

EXAMPLE VI 23.75 Grams of 19 percent Conductex SC Ultra carbon black dispersed into poly(methylmethacrylate) and 1.25 grams of MT3103 fumed titania (NAC Corporation) were processed in the Nara Hybridizer (NHS-0) using the processing conditions of Example I. There were prepared carrier particles by coating 4,545 grams of a Hoeganese anchor steel core, 90 microns in diameter, with 45 grams of the 19 percent Conductex SC Ultra carbon black conductive component dispersed into poly(methylmethacrylate) hybridized with the additive MT3103, 1 percent coating weight, by the procedure of Example I.

A developer composition was then prepared by mixing 194 grams of the above prepared carrier particles with 6 grams of the toner composition of Example I. Thereafter, the triboelectric charge on the carrier particles was determined by the known Faraday Cage process, and there was measured on the carrier a charge of 9.8 microcoulombs per gram, substantially lower than the triboelectric charge imparted to a carrier coated with 19 percent Conductex SC Ultra carbon black dispersed into poly(methylmethacrylate) without processing in the hybridizer, 12.9 microcoulombs per gram, or with processing in the Nara Hybridizer but without the addition of an insulating additive, 12.3 microcoulombs per gram. Further, the conductivity of the carrier, as determined by forming a 0.1 inch long magnetic brush of the carrier particles, and measuring the conductivity by imposing a 10 volt potential across the brush, was $1.1 \times 10^{-7}$ mho-cm$^1$. Therefore, these carrier particles were also conducting.

With respect to the triboelectric numbers in microcoulombs per gram, they were determined by placing the developer materials in an 8 ounce glass jar, with 3 percent by weight toner compositions, placed on a Red Devil Paint Shaker and agitated for 10 minutes. Subsequently, the jar was removed and samples from the jar were placed in a known tribo Faraday Cage apparatus. The blowoff tribo of the carrier particles was then measured.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K. K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin carrier beads of the present invention in various amounts, however, generally these waxes are present in the toner composition in an amount of from about 1 percent by weight to about 15 percent by weight, and preferably in an amount of from about 2 percent by weight to about 10 percent by weight, and may in embodiments function as fuser roll release agents.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, an optional wax, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner compositions are usually jetted and classified subsequent to preparation to enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners is preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

The carrier triboelectric charge in the above Examples is a positive.

Other modifications of the present invention may occur to one of ordinary skill in the art based upon a reading of the present disclosure, and these modifications are intended to be included within the scope of the present invention.

What is claimed is:

1. A process which comprises subjecting a mixture of a polymer, a conductive component and an additive to mechanical energy of from about 1 to about 20 kilowatt hours per kilogram and an intensity of from about 20 to about 90 kilowatts per kilogram, and wherein said subjecting is accomplished until said additive is substantially permanently embedded in said polymer.

2. A process in accordance with claim 2 wherein said additive is selected in an amount of from about 5 to about 20 weight percent based on the weight percent total of said polymer and said additive.

3. A process in accordance with claim 1 wherein said energy is from about 10 to about 20.

4. A process in accordance with claim 1 wherein said intensity is from about 50 to about 90.

5. A process in accordance with claim 1 wherein said subjecting is accomplished in a hybridizer.

6. A process in accordance with claim 1 wherein subsequent to said subjecting there results a polymer with said additive embedded thereon, and said conductive component dispersed in said polymer surface.

7. A process in accordance with claim 1 wherein the additive is a fumed silica.

8. A process in accordance with claim 1 wherein the additive is a metal oxide.

9. A process in accordance with claim 1 wherein the additive is a metal.

10. A process in accordance with claim 1 wherein the additive is titanium dioxide.

11. A process in accordance with claim 1 wherein the additive is aluminum, nickel, iron, or silicon oxide.

12. A process in accordance with claim 1 wherein the polymer is polymethylmethacrylate.

13. A process in accordance with claim 2 wherein the polymer is polymethylmethacrylate.

14. A process in accordance with claim 3 wherein the polymer is polymethylmethacrylate.

15. A process in accordance with claim 1 wherein said subjecting is for a period of from about 2 to about 20 minutes.

16. A process in accordance with claim 1 wherein a conductive component is added to the product obtained.

17. A process in accordance with claim 1 wherein the conductive component is carbon black selected in an amount of from about 15 to about 40 weight percent.

18. A process in accordance with claim 1 wherein the conductive component is carbon black selected in an amount of from about 20 to 30 weight percent.

19. A substantially dust free process for the preparation of polymers with additives which process comprises subjecting a mixture of polymers and an additive to mechanical energy of from about 1 to about 20 kilowatt hours per kilogram and an intensity of from about 20 to about 90 kilowatts per kilogram, and wherein said subjecting is accomplished until said additives are embedded in said polymers.

20. A process in accordance with claim 19 wherein there are selected two polymers.

21. A process in accordance with claim 20 wherein one polymer is polymethylmethacrylate, and one polymer is polyvinylidene fluoride.

22. A substantially dust free process for the preparation of carrier particles which comprises subjecting a mixture of a polymer, a conductive component, and an additive to mechanical energy of from about 1 to about 20 kilowatt hours per kilogram and an intensity of from about 20 to about 90 kilowatts per kilogram, and thereafter applying the polymer product obtained to a carrier core.

23. A process in accordance with claim 22 wherein the core is a metal or a ferrite.

24. A process in accordance with claim 23 wherein the polymer with additive is fused to the carrier core by heating at a temperature of from about 320° F. to about 650° F.

25. A process in accordance with claim 24 wherein said heating is for a period of from about 20 minutes to about 120 minutes, followed by cooling.

26. A process in accordance with claim 17 wherein the conductivity of the resulting carrier is from about $10^{-12}$ to about $10^{-6}$ mho/cm.

27. A process in accordance with claim 1, wherein said mechanical energy is about 14.7 kilowatt hours per kilogram, the polymer is poly(methylmethacrylate), the conductive component is carbon black, and the additive is silica.

28. A process in accordance with claim 19, wherein said mechanical energy is about 14.7 kilowatt hours per kilogram.

29. A process in accordance with claim 19, wherein said additive to a fumed silica, a metal oxide, or a metal.

30. A process in accordance with claim 29, wherein there is selected an additive of fumed silica.

31. A process in accordance with claim 29, wherein the additive is aluminum, nickel, iron, siliconoxide, or titaniumdioxide.

32. A process in accordance with claim 31, wherein the polymer is polymethylmethacrylate.

33. A process in accordance with claim 22, wherein said additive is fumed silica.

34. A process in accordance with claim 33, wherein the conductive component is carbon black.

35. A process in accordance with claim 33, wherein the polymer is polymethylmethacrylate.

36. A substantially dust free process for the preparation of polymers with additives consisting of subjecting a mixture of polymers and an additive to a mechanical energy of from about 1 to about 20 kilowatt hours per kilogram and an intensity of from about 20 to about 90 kilowatts per kilogram, and wherein said subjecting is accomplished until said additives are embedded in said polymers.

37. A process in accordance with claim 22 wherein the additive is a metal oxide.

38. A process in accordance with claim 22 wherein said energy is from about 10 to about 20, and said intensity is from about 50 to about 90.

39. A process in accordance with claim 22 wherein the polymer is polymethylmethacrylate.

40. A process in accordance with claim 22 wherein the conductive component is carbon black.

41. A process in accordance with claim 23 wherein said polymer comprises a mixture of polymers.

* * * * *